2 Sheets--Sheet 1.

Z. HUNT.

Coal-Stove.

No. 6,709. Reissued Oct. 19, 1875.

Witnesses:
Harry Smith
Thomas McIlvain

Inventor:
Zebulon Hunt
by his Attorneys
Howson and Son

2 Sheets--Sheet 2.

Z. HUNT.

Coal-Stove.

No. 6,709. Reissued Oct. 19, 1875.

Witnesses:
Harry Smith
Thomas McIlvain

Inventor:
Zebulon Hunt
by his Attorneys
Howson and Son

6,709. COAL-STOVES. Zebulon Hunt, Hudson, N. Y., assignor, by mesne assignments, to Perry & Co. Patent No. 50,073, dated Sept. 19, 1865. [Filed Oct. 11, 1875.]

*To all whom it may concern:*

Be it known that I, ZEBULON HUNT, of the city of Hudson, county of Columbia and State of New York, have invented certain Improvements in Coal-Stoves; and I do hereby declare the following to be a full, clear, and exact description of the same.

The object of these improvements is to increase the heating capacity of a stove by combining therewith a system of flues, described hereafter; also, to so combine the walls of ascending and descending flues with the interior casing of the stove that they shall present but little obstruction to the perfect illumination of the same.

Figure 1:
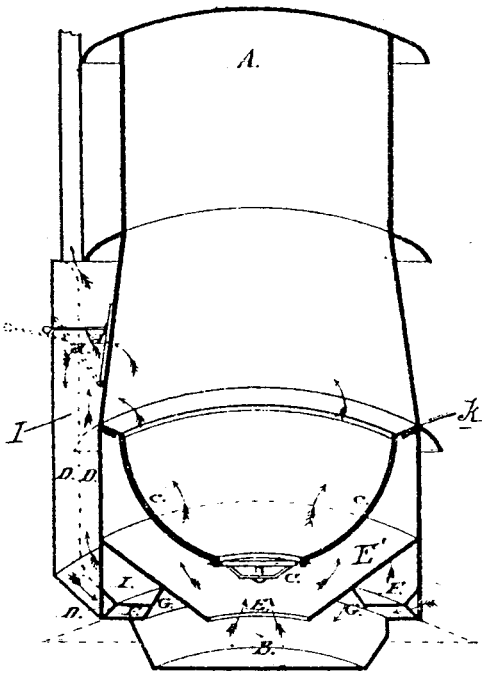
Figure 2:
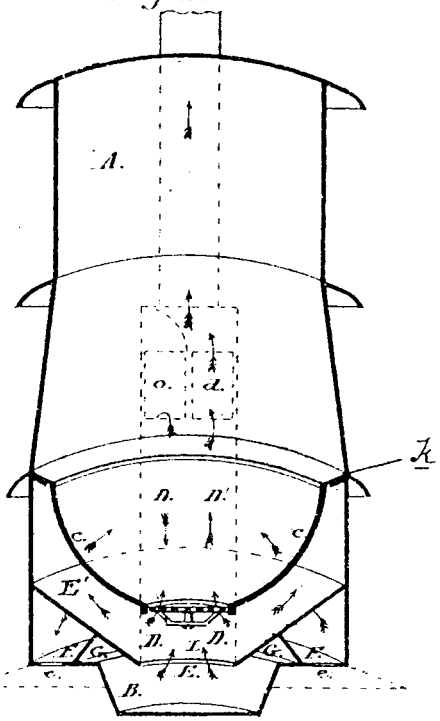
Figure 4:
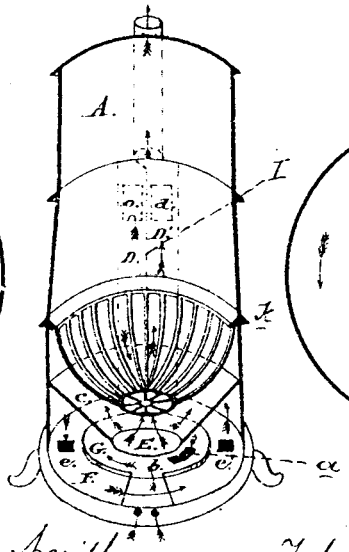
Figure 3:
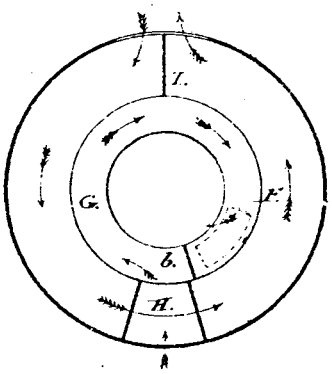
Figure 5:
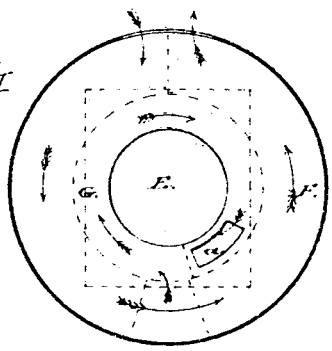
Figure 6:
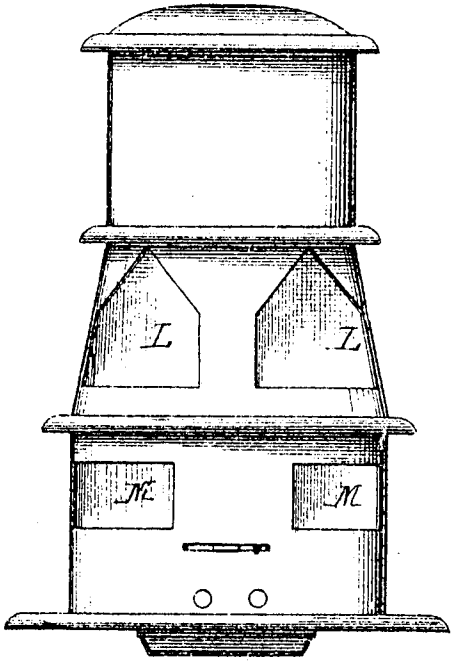

In the accompanying drawing, Figure 1, Sheet 1, is a vertical section of the stove, showing the exterior in section; Fig. 2, a transverse vertical section; Fig. 3, a sectional plan; Fig. 4, a vertical section, showing the base in perspective; Fig. 5, a sectional plan; Fig. 6, Sheet 2, a front view of the exterior of the stove; and Fig. 7, a rear view of the same.

Figure 7:
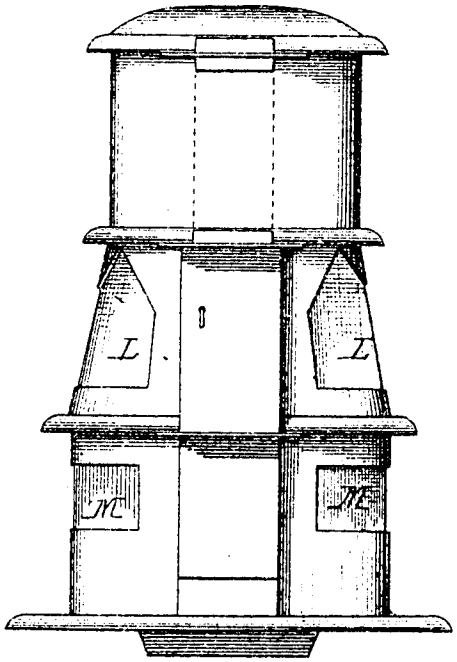

The body of the stove is usually in three sections or stories, (see Figs. 1, 2, and 4,) the first and second sections being provided with as many glass or mica lights as convenient, and as shown in Figs. 6 and 7, referred to hereafter. The first or lower section incloses the ash-chamber and fire-pot, and the second and third sections inclose the combustion-chamber, these two chambers being separated from each other by the fitting of the flanged upper edge *k* of the fire-pot within the outer casing. The fire-pot being thus suspended within the ash-chamber, all the air which enters the same is compelled to pass through the grated portions of the pot, or through the fire-bed, thus promoting combustion, instead of retarding it, as would be the case if any were allowed to pass up the outside, and over the periphery of the said fire-pot. By this arrangement a brilliant illumination is obtained from the incandescent fuel through the windows formed in the ash-pit section, and also from the top surface of the incandescent fuel and the burning gases above the same, through the windows formed in the combustion-chamber section. In the front of the second section is a doorway, through which coal can be introduced into the fire-pot *c c*. The flues D and D′ are wholly outside of the cylinder or exterior casing A, but adjoin, and are built on the said casing, part of which, in fact, forms one of the walls of each flue. These flues extend from the top of the second section down to the bottom or base section, where they open into the hot-air flue F in the base of the stove. Each of the flues D and D′ has near the top an opening, that of one flue being furnished with a damper, *d*, so as to close or expose the said opening, and that of the other flue, O, being always exposed. Through this opening *o* the products of combustion pass into the descending flue D, and down the latter into the chamber or flue F of the base-section of the stove. The descending flue D is separated from the flue D′ by a partition, I, which also divides the chamber F, and thus compels the products of combustion to make the circuit of the said chamber F before it can pass into the ascending flue D′, and thence into the chimney.

In their course through the chamber F, the products of combustion pass over the bridge-flue H, which has no communication with the said chamber, and through which, by suitable openings in the shell of the stove, cold air passes into a circular flue, G, in the base-section, and thence around to a partition, *b*, in the said flue, at which point the air passes, through an opening, *a*, into the ash-pit B, and thence, through a central opening, E, in the chamber E′, to the grate *c* of the fire-pot.

When the damper *d* is opened, for the purpose of kindling the fire, the products of combustion pass off directly to the smoke-pipe; but, after the fire has been kindled, the damper *d* should be closed, when the products of combustion will pass into the descending flue D, then pursue the course pointed out through the base-section, then upward through the ascending flue D′, and past the closed damper, to the smoke-pipe.

Apertures *e e* are made in the bottom of the stove, for the purpose of cleansing the chamber F.

The relation of the ascending and descending flues to the illuminated casing of the stove will be best observed in Fig. 7. As before remarked, the two flues adjoin each other, being separated by a simple partition, three walls of each flue being built on the exterior casing, and part of the said casing forming the fourth wall of each flue. By thus building the walls of the ascending and descending flues on the exterior casing, and at the rear of the stove, and dividing the same by a single plate, two important results are attained: First, one wall of each flue is exposed to the direct action of the products of combustion in the fire-chamber, and the heating capacity of the stove is consequently greater than when the ascending and descending flues are in pipes situated at a distance from the body of the stove, for the reason that the heat imparted to the ascending flue D′, partly from the descending flue and partly from the casing of the stove, rarefies the air in the said ascending flue, and induces the rapid passage of the products of combustion in the direction pointed out, and thereby materially increases the draft, and consequently the heating power; and, second, the adjoining flues, occupying a contracted space, permit the illuminating doors or windows M to be extended around the stove almost to the same extent as in stoves having no ascending or descending flues, and the result is a complete and thorough illumination of that class of stoves which, prior to this invention, had their descending flues so situated as to prevent such illumination.

I claim as my invention—

1. The adjoining ascending and descending flues D and D′ at the rear of the stove, in combination with the flue or chamber F in the base-section, all being constructed substantially in the manner and for the purpose described.

2. The bridge-flue H, in combination with the circular flue G, substantially as specified.

3. The adjoining flues D and D′, situated at the rear of the stove, and having walls built on the casing of the same, in combination with the illuminating doors or windows in the draft-chamber base-section.

4. A heating-stove constructed with ascending and descending flues, placed on the rear side thereof, in combination with illuminating doors and windows in the draft-chamber base-section.

In testimony whereof I have signed my name to this specification in the presence of two subscribing witnesses.

ZEBULON HUNT.

Witnesses:

ALEX. S. ROWLEY,
SEWARD WATTLES.